United States Patent [19]

Steppacher

[11] Patent Number: 4,543,187
[45] Date of Patent: Sep. 24, 1985

[54] FILTER PLATE

[76] Inventor: Paul A. Steppacher, 2407 N. Washington Ave., Scranton, Pa. 18509

[21] Appl. No.: 638,681

[22] Filed: Aug. 8, 1984

Related U.S. Application Data

[63] Continuation of Ser. No. 336,429, Dec. 31, 1981, abandoned.

[51] Int. Cl.$^4$ .......................... B01D 39/14; C02C 1/22
[52] U.S. Cl. .................................... 210/232; 210/231; 210/445; 210/486
[58] Field of Search ........ 210/231, 498, 486, 227-230, 210/445; 35/DIG. 31, 482, 483, 490, 492, 493, 495, 496, 497, 378, 507, 379

[56] References Cited

U.S. PATENT DOCUMENTS 4,045,350  8/1977  Kudf et al. .......................... 210/486

Primary Examiner—John Adee
Attorney, Agent, or Firm—David A. Tamburro

[57] ABSTRACT

A lightweight, substantially hollow filter plate constructed of foam molded thermoplastic material is formed by two separate identical plate sections each having a forward and rearward face. In a recessed type plate, the peripheral area of the rearward face of each section includes a plurality of support ribs arranged in lattice type configuration. In one embodiment the plate sections are integrally joined together with their rearward faces opposing each other and with the support ribs of one section butting against the opposing support ribs of the other section to produce a cellular construction light in weight but yet sufficiently strong to withstand the operating pressures normally associated with standard filter press machines.

12 Claims, 7 Drawing Figures

FILTER PLATE

This is a continuation of application Ser. No. 336,429, filed Dec. 31, 1981, now abandoned.

BACKGROUND AND SUMMARY OF THE INVENTION

This invention relates to filter press machines for separating solids from liquids, and more particularly to a novel, lightweight, more economical thermoplastic filter plate for use in such machines.

Thermoplastic filter plates of various type constructions have been utilized and suggested in the past. Typical prior constructions commonly made of polypropylene are shown in U.S. Pat. Nos. 4,229,304; 4,217,224; 4,166,035; 3,957,645; 3,931,014; and 3,926,811.

While some of these prior plates have been operatively acceptable in some applications, a need exists in the art for a plate which is cheaper and easier to manufacture and which consequently allows the selective use of various type thermoplastic materials possessing different temperature and chemical resistant characteristics within affordable cost limitations.

Accordingly, the primary object of this invention resides in the provision of a novel, lightweight thermoplastic filter plate which is relatively inexpensive and easy to manufacture, but yet possesses sufficient strength to withstand normal operating pressures of filter press machines.

Another object of the invention resides in the above filter plate which is constructed in two identical plate sections joined together in back to back relationship with the rearward faces of each section formed with a plurality of lattice type support ribs which butts against each other to form a hollow cellular type construction at least around the periphery of the plate.

Still another object of the invention resides in the provision of the above filter plate, wherein the plate sections may be advantageously foam molded to minimize the required molding time, and substantially reduce the finished weight of the plate, and therefor significantly reduce costs.

A further object of the invention resides in the provision of the above filter plate, wherein the plate sections may be more economically formed from various thermoplastic materials such as the commonly used polypropylene, or the more expensive plastics marketed under the tradenames Polysulfone, Kynar, or Ryton.

Other objects and advantages of the invention will become apparent by reference to the following detailed description of a preferred embodiment of the invention and to the accompanying drawings.

DETAILED DESCRIPTION OF THE INVENTION

Figure 1:
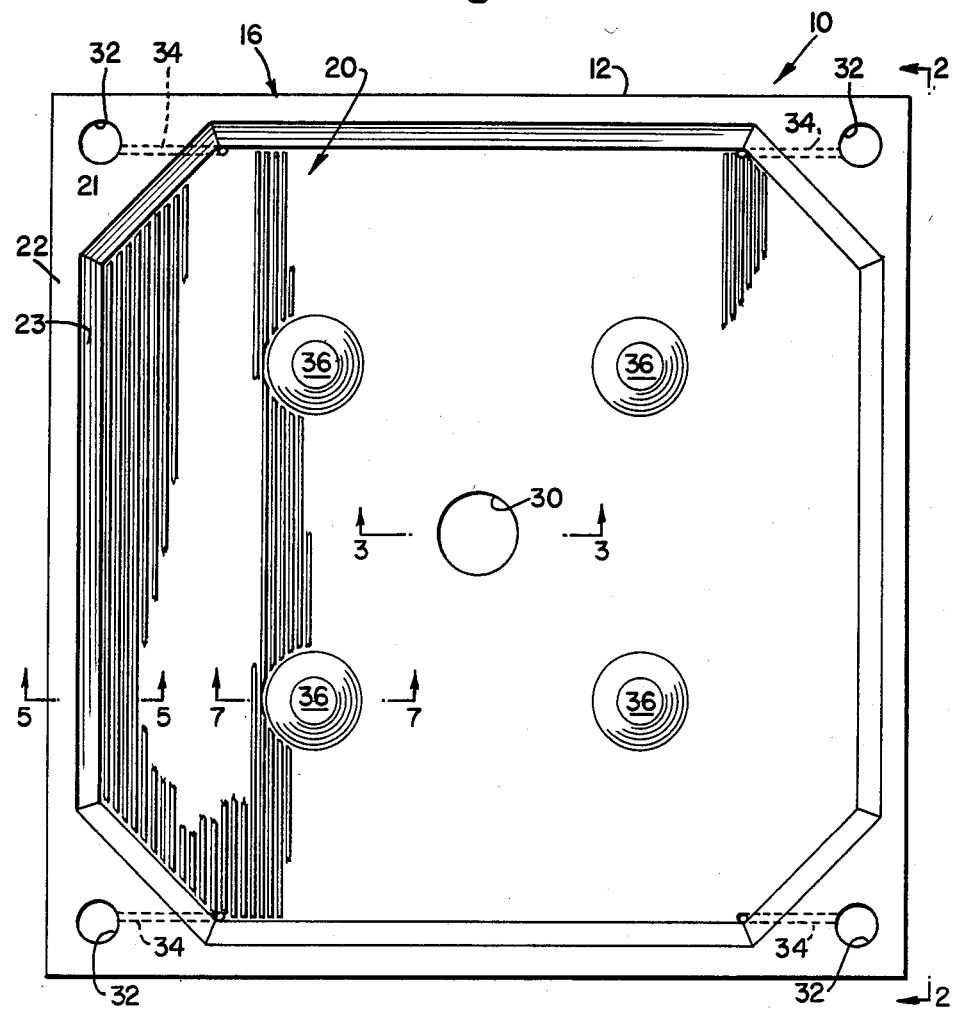
FIG. 1 is a front elevation view of a filter plate constructed according to the invention.
Figure 2:
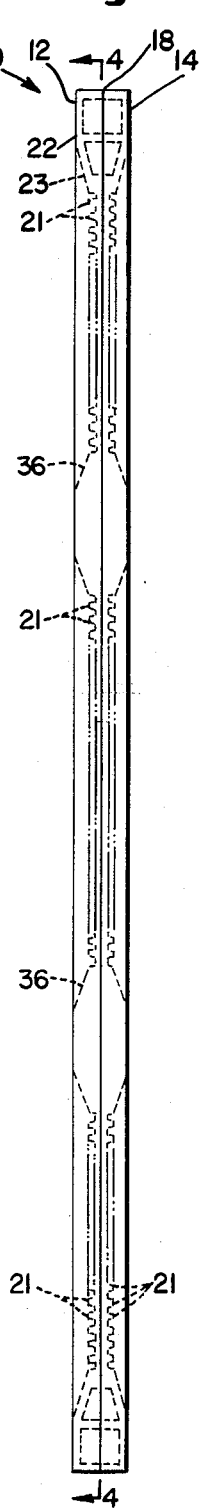
FIG. 2 is an end view taken along line 2—2 of FIG. 1.
Figure 3:
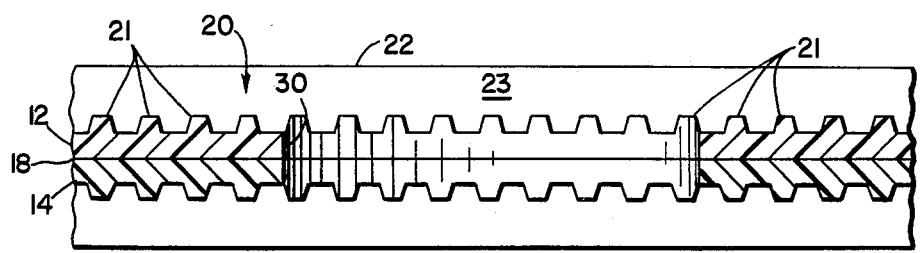
FIG. 3 is a fragmentary sectional view taken along line 3—3 of FIG. 1.
Figure 4:
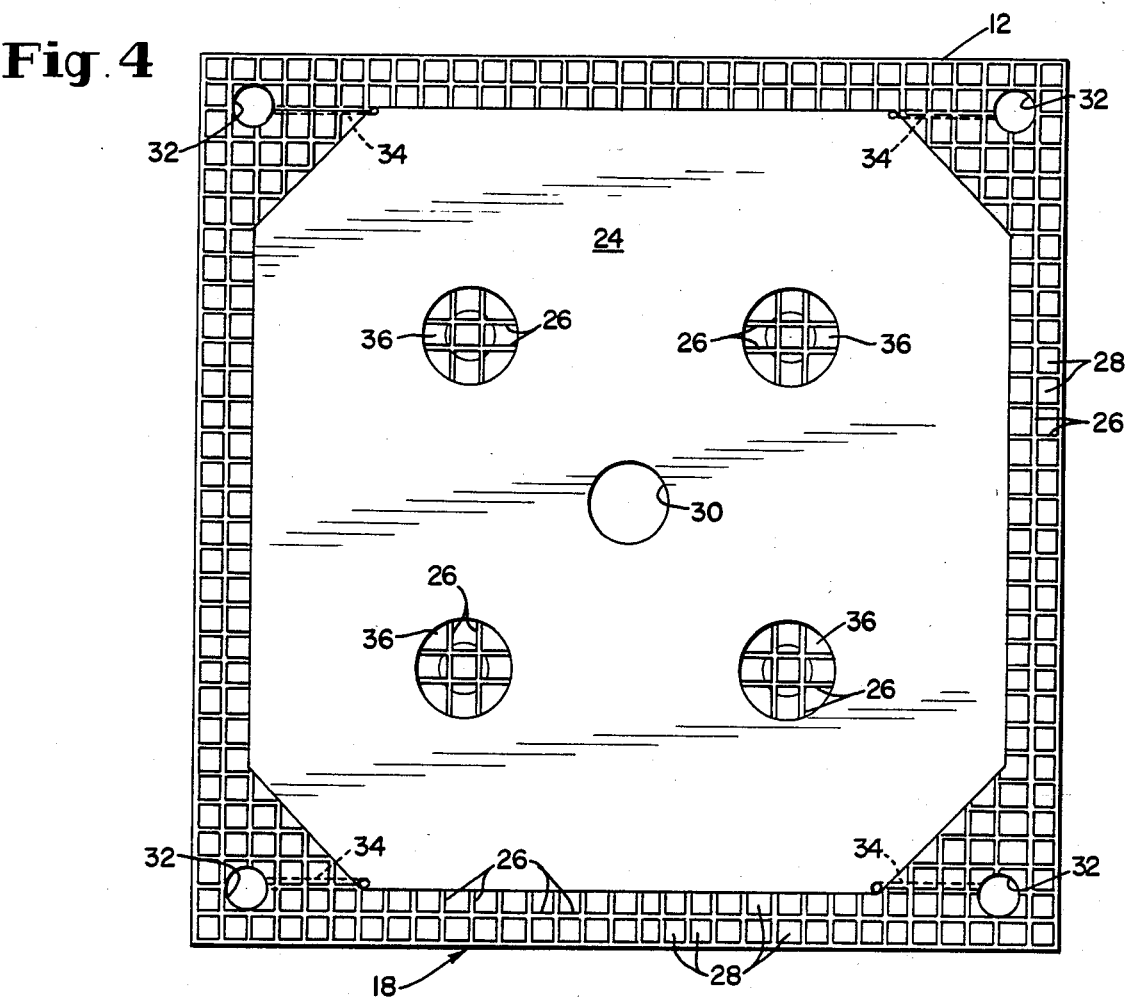
FIG. 4 is a fragmentary sectional view taken generally along line 4—4 of FIG. 3 and illustrating the rearward face of a plate section.
Figure 5:
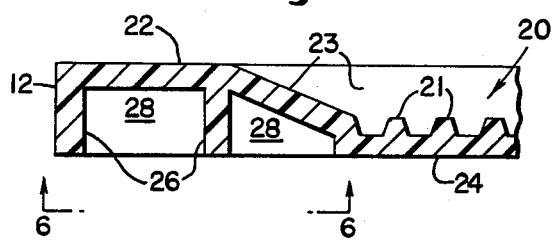
FIG. 5 is an enlarged fragmentary sectional view taken generally along line 5—5 of FIG. 2.
Figure 6:
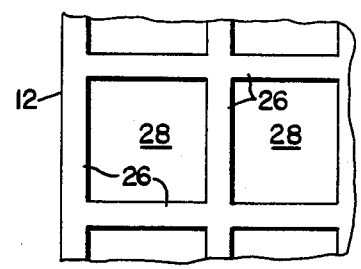
FIG. 6 is a fragmentary view taken along line 6—6 of FIG. 5.
Figure 7:
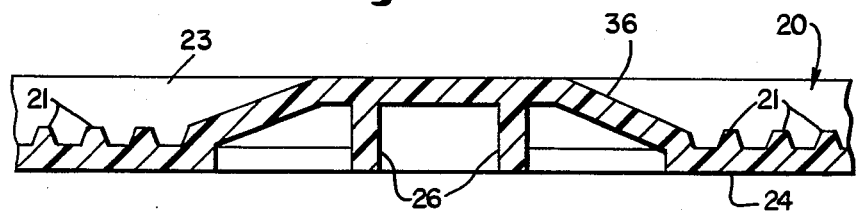
FIG. 7 is a fragmentary view taken along line 7—7 of FIG. 2.

Referring now to the drawings, the filter plate 10 of the invention, illustrated as a recessed type plate, comprises a pair of identical, separately formed, thermoplastic plate sections 12 and 14 suitably integrally joined together in back-to-back mirror image relationship, for example as by fusion welding. Each of the plate sections 12 and 14 includes a forward face 16 which acts as a filtrate drainage surface and a rearward face 18 which abut together in mirror image fashion when the plate sections are joined.

Forward face 16 includes an inner recessed drainage area 20 having drainage ribs 21 and an outer peripheral area 22 which extends above the plane of area 20 and is connected therewith by a bevelled area 23. Rearward face 18 of each plate section is formed with a planar surface 24 behind area 20 and a plurality of support ribs 26 projecting rearwardly from peripheral area 22 in lattice type configuration and terminating in the same plane as surface 24.

As shown in the drawings, when plate sections 12 and 14 are joined together in back to back relationship, ribs 26 of one section abut against the opposing ribs 26 of the other section to define a plurality of hollow cells 28 within the peripheral area of plate 10. This substantially reduces the overall weight of plate 10 and the amount of plastic material for its production. However, during operation of a filter press, pressure is applied uniformly against peripheral area 22 and the abutting ribs 26 provide sufficient strength to maintain the structural integrity of the plate.

In typical fashion plate 10 includes a central feed opening 30, and a plurality of drain openings 32 which communicate with drainage area 20 through passages 34. If necessary to improve the strength of plate 10, particularly when it is of large size, e.g. 48' square, forward faces 16 may be provided with a plurality of spacer bosses 36 which terminate in the plane of peripheral area 22 and which also have a plurality of lattic type support ribs 26 projecting rearwardly therefrom.

As mentioned above, the two piece cellular, lattice type construction of plate 10 results in a significant reduction in the weight of the plate without materially sacrificing strength. Material costs are substantially reduced. In addition, plate sections 12 and 14 may be readily molded by a foam molded process at higher molding temperatures which is substantially faster and cheaper than the now commonly used injection and compression molded processes. Foam molding plate 10 further reduces both material and manufacturing costs, while producing a plate useable at higher operating temperatures.

Because material weight requirements are reduced, the invention makes possible the selective use of various type plastics such as Polysulfone, Kynar, or Ryton, even though these are more expensive than the commonly used polypropylene.

While the invention has been illustrated above as comprising two identical plate sections 12 and 14 in back-to-back relationship, if necessary for strength purposes, a flat solid intermediate plate section may be interposed between sections 12 and 14, with support ribs 26 of sections 12 and 14 still remaining in operatively opposed relationship.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A thermoplastic filter plate for use in a filter machine used in separating solids from liquids, the plate comprising a first separate component having a forward face including a filtrate drainage surface and a rearward face including means to provide support ribs; a second separate component which is substantially identical to said first component; and means to join said first and second components with their rearward faces opposing each other in mirror image fashion so that the support ribs of said first component operatively oppose the support ribs of said second component to provide a plate of minimum weight and sufficient strength.

2. The filter plate defined in claim 1 wherein said support ribs are formed in a lattice type configuration.

3. The filter plate defined in claim 1, said plate components being constructed of a foam molded thermoplastic material.

4. The filter plate defined in claim 3, wherein the material is polypropylene.

5. The filter plate defined in claim 3, wherein the material is selected from a group consisting of Polysulfone, Kynar, and Ryton.

6. The filter plate defined in claim 1, said forward face including an inner area which constitutes said drainage surface and an outer peripheral area which extends above the plane of said inner area, said support ribs on said rearward face being formed behind said outer peripheral area.

7. The filter plate defined in claim 6, said forward face including a plurality of spacer bosses located within said inner area and extending thereabove, and said rearward face having a plurality of support ribs formed behind said bosses.

8. The filter plate defined in claim 1, wherein the support ribs of one section abut against the opposing support ribs of the other component.

9. A thermoplastic filter plate for use in a filter machine used in separating solids from liquids, the plate comprising a first separate component having a forward face including a filtrate drainage surface and a rearward face including means to provide support ribs; a second separate component which is substantially similar to said first component; and means to join said first and second components with their rearward faces opposing each other so that the support ribs of said first component operatively cooperate with the support ribs of said second component to provide a plate of minimum weight and sufficient strength.

10. The filter plate defined in claim 9, said forward face including an inner area which constitutes said drainage surface and an outer peripheral area which extends above the plane of said inner area, said support ribs on said rearward face being formed behind said outer peripheral area.

11. The filter plate defined in claim 10, said forward face including a plurality of spacer bosses located within said inner area and extending thereabove, and said rearward face having a plurality of support ribs formed behind said bosses.

12. The filter plate defined in claim 9, said support ribs forming a hollow cellular type construction at least around the periphery of said plate.

* * * * *